United States Patent Office 3,031,262
Patented Apr. 24, 1962

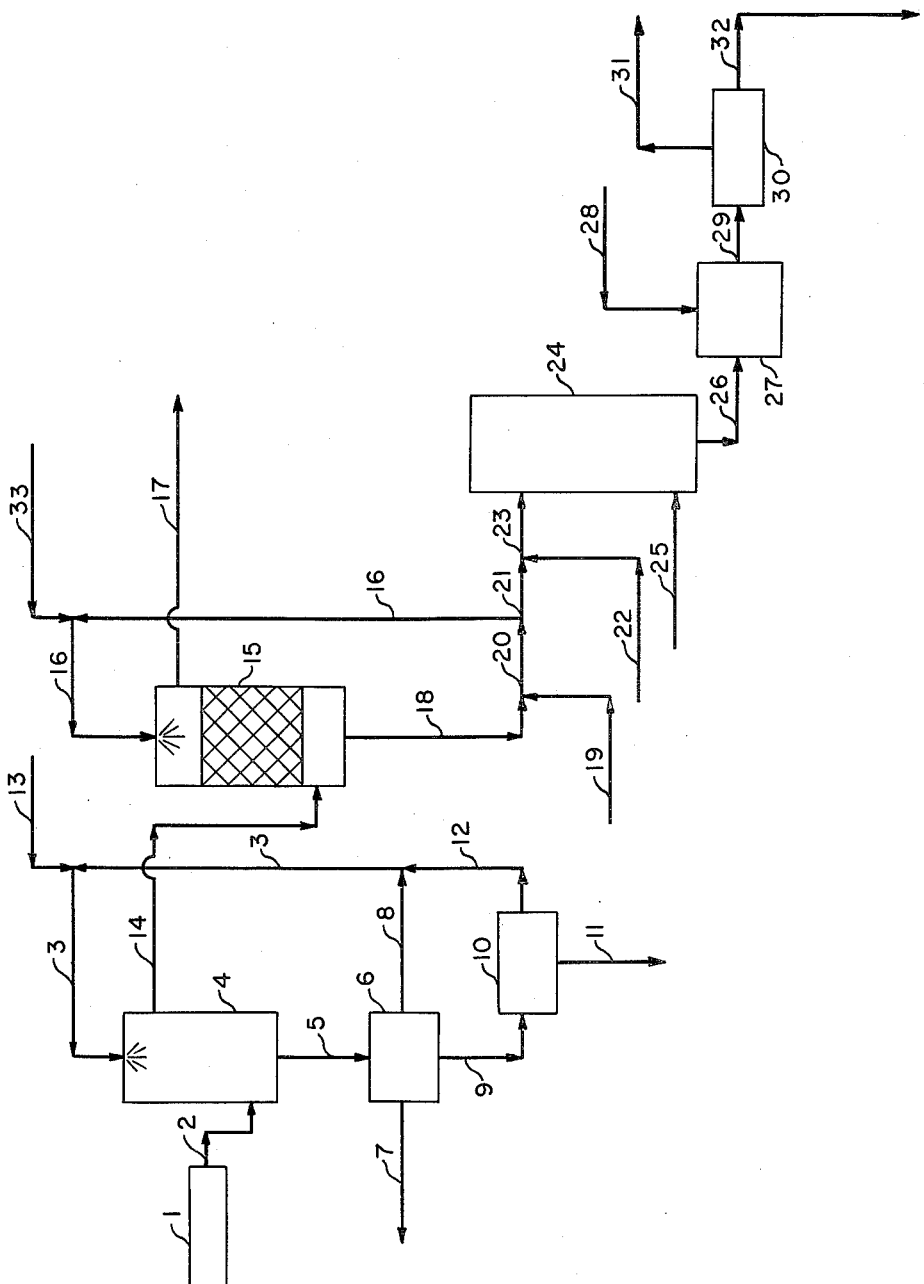

3,031,262
RECOVERY OF OXIDES OF SULFUR AND FLUORIDES FROM GAS MIXTURES
William J. Rosenbloom, Westport, Conn., assignor to Chemical Construction Corporation, New York, N.Y., a corporation of Delaware
Filed Feb. 27, 1959, Ser. No. 795,990
10 Claims. (Cl. 23—38)

This invention relates to the treatment of off-gas containing fluorine and sulfur compounds, derived from processes such as the calcining of phosphatic materials, aluminum smelting, cement manufacture, enameling operations, metallurgical operations in which fluorspar is used as a flux, and processes of uranium metallurgy and recovery. It has been found that the fluorine and sulfur values can be recovered as useful products by scrubbing said off-gases with an ammonium sulfite-bisulfite solution, whereby the fluorine and sulfur compounds are absorbed as ammonium compounds. The fluorine is removed and recovered as an insoluble metal fluoride which is formed when a soluble metal salt is added. Additionally, sulfur compounds are oxidized and recovered as ammonium sulfate.

The concept of roasting or calcining phosphate rock to remove fluorine is well known. Such treatment is necessary or desirable in order to convert the phosphorus present into a more available form. In the natural state, phosphorus values are present mainly as fluorapatite, a stable compound containing phosphorus and fluorine. Thermal treatment is applied in order to decompose or alter the fluorapatite, and separate the phosphorus values from chemical combination with fluorine. Usually fluorine is driven off as a component of the off-gas from the process, mostly as hydrogen fluoride. However, some silicon tetrafluoride may also be present. A typical process of this nature is the roasting of phosphate rock in a horizontal rotary kiln, whereby the material is rendered suitable for use as a feed component in electric furnace phosphorus production. In some operations of this nature, carbonaceous material such as coal may be added to the kiln feed, in order to provide a reducing atmosphere during roasting or for other purposes. In such cases, the off-gas may contain appreciable quantities of sulfur dioxide and sulfur trioxide. The present invention provides a process whereby oxides of sulfur which may be present in the off-gas are removed and recovered from the off-gas together with fluorine values.

Another well known thermal process for the treatment of phosphate rock is the production of fused tricalcium phosphate. In this process, the rock is subjected to very high temperatures in a vertical shaft furnace, so as to fuse the material into a fluid mass. The fluorapatite structode is destroyed, and most of the floorine is released as hydrogen fluoride which volatilizes into the furnace off-gas. The off-gas usually also contains significant amounts of sulfur dioxide derived from the fuel used to fire the furnace.

An additional process pertinent to this invention involves the calcining of superphosphate fertilizer. This is done in order to increase phosphorus availability in the fertilizer product. An elevated temperature level is employed but it is not necessary to generate the extremely high temperathres used in the aforementioned processes since the original phosphatic raw material has already been treated with sulfuric acid in the fertilizer process. A small proportion of coal or other carbonaceous material is usually added to the superphosphate fertilizer prior to calcining, in order to maintain a reducing atmosphere in the calcining process.

Numerous other industries besides the phosphatic material processes generate gas streams containing fluorine and sulfur compounds. Some of these were previously mentioned.

The processing of these off-gases to remove fluorine values is desirable for several reasons. Allowing the untreated off-gases to disperse into the atmosphere may result in a serious air pollution problem. The fluorine values become concentrated in the vegetation in surrounding areas, with serious consequences to animal and human health. Additionally, fluorine recovery is desirable from an economic viewpoint. Recovery and conversion of the fluorine values to a useful and commercially salable product is an important aspect of this invention.

A method of recovering fluorine was developed by the Tennessee Valley Authority, in connection with certain pilot plant and semi-works studies on the treatment of Tennessee phosphate rock. The method forms the subject of U.S. Patent No. 2,573,704, and consists of passing the off-gases through a solid absorbent bed of lump limestone. The hydrogen fluoride present in the off-gases reacts with the limestone to form powdery solid calcium fluoride. Portions of the bed were intermittently drawn off and screened. The oversize consisted of unreacted limestone, while the undersize (minus 6-mesh) was about 80% calcium fluoride, contaminated with calcium sulfate (formed from sulfur dioxide present in the off-gas), furnace dust, and unreacted limestone. The commercial utility of this material is uncertain, in competition with natural calcium fluoride (fluorspar) which is currently produced in large tonnage quantities and marketed as a comparatively pure product. Basic objections to this process are that it is intermittent, provides relatively slow reaction rates and possibly incomplete recovery of fluorine, necessitates much solids-handling equipment, does not efficiently cope with sulfur dioxide content of the off-gas, and produces a fluoride product of questionable utility.

It is an object of the present invention to treat an off-gas containing fluorine and sulfur compounds, so that said off-gas will be rendered relatively innocuous and suitable for discharge into the atmosphere without causing air pollution.

Another object is to recover fluorine values from said off-gas in a chemically active state, so that the fluorine values may be readily utilized and converted into useful products.

A further object is to provide a process for recovery of fluorine values from said off-gases, which concurrently recovers oxides of sulfur from the off-gases.

An additional object of the invention is to recover fluorine values from said off-gases in the form of metal fluoride, which may be readily utilized.

Other objects and advantages of this invention will become evident from the description which follows.

Referring to the figure, which is a schematic flowsheet of the process, the gas generated in unit 1 leaves as the off-gas stream 2. This contains sulfur dioxide, sulfur trioxide and fluorine values. The off-gas stream is first contacted or scrubbed with a circulating sulfuric acid stream 3 in spray or scrubbing chamber 4. This is an optional step, and may be desirable or necessary in order to cool the gas stream, remove sulfur trioxide as sulfuric acid rather than ammonium sulfate, and/or remove dust and dirt from the gas stream. In any case, if the gas stream 2 is scrubbed in unit 4, the resulting acidic liquor stream 5 is passed to a settler-separator 6 from which a product sulfuric acid stream is removed via 7. A portion of the liquid stream is recirculated via 8 and 3 while the bottoms portion of stream 5 is removed via 9, filtered in 10, and the solids portion discarded via 11 while the liquid is recycled via 12 and 3. Makeup water is added via 13.

Returning to scrubber 4, the off-gas stream which has been cleaned, cooled and freed of sulfur trioxide is removed via 14 and passed to absorption tower 15. Unit 15 is any suitable apparatus for accomplishing liquid-gas contact such as a spray tower, ceramic packed tower, etc. In unit 15, the gas stream is scrubbed by a circulating ammonium sulfite-bisulfite solution admitted via 16. This solution removes sulfur dioxide and fluoride values from the gas stream. The residual gas stream is discharged to the atmosphere via 17.

The absorption reactions in unit 15 convert a portion of the ammonium sulfite admitted via 16 to ammonium bisulfite, and also result in the formation of ammonium fluoride in the solution. The laden absorbent solution, containing principally ammonium bisulfite and ammonium fluoride, leaves unit 15 via 18. Makeup ammonia is added via 19 in order to restore a suitable ammonium sulfite-bisulfite ratio, and the adjusted solution is now recycled via 20 to 16. Water makeup may be added via 33 if necessary.

A portion of stream 20 is diverted to line 21 as product, additional ammonia is added via 22 to convert bisulfite present to normal sulfite, and the product stream 23 now containing principally ammonium sulfite and ammonium fluoride is passed into autoclave 24. An oxygen-containing gas such as air is admitted via 25, and under the influence of elevated pressure and temperature the ammonium sulfite is oxidized to ammonium sulfate. The resulting solution is withdrawn via 26 and passed into reaction vessel 27. Metal sulfate and, if necessary, additional ammonia are also admitted to unit 27 via 28.

The conditions in unit 27, consisting of pH higher than 7 and metal ions in solution, cause the conversion of ammonium fluoride to metal fluoride and the precipitation of all fluoride values from the solution as metal fluoride. Additionally, silicon dioxide may also be precipitated at this point, derived from any silicon tetrafluoride originally present in the gas stream, which is absorbed into the aqueous scrubbing solution in unit 15 as ammonium silicofluoride and subsequently decomposed as the pH is raised. It should be noted that alkaline agents other than ammonia may be admitted via 28 for pH adjustment; however, ammonia is preferred. The resulting stream is passed via 29 to filter 30, and a solids product containing primarily metal fluoride is removed via 31. Ammonium sulfate is recovered from the residual solution by crystallization or other suitable methods.

Among those metal salts which have been found to effect a removal of over 90% of the fluorine present are aluminum sulfate, magnesium sulfate, calcium hydroxide and calcium sulfate.

The basic process is subject to certain process requirements in practice. Thus it has been found that sulfite oxidation runs employing air resulted in unsatisfactory reaction rates and only partial conversion of the air pressure during the conversion run was less than 150 p.s.i.g. In these cases less than 50% conversion was attained after oxidation treatment lasting over 60 minutes. Practical considerations indicated that optimum results were attained at an operating pressure of 500 p.s.i.g. when air was used as an oxidant. If oxygen is utilized as an oxidant rather than air, the pressure requirement is considerably lowered. In certain tests using oxygen alone as the oxidant, satisfactory conversion was attained at a pressure level of 40 p.s.i.g.

An alternative, or simplification, assuming now an off-gas containing the components originally specified, might be to omit the processing of units 4, 6 and 10. The original gas stream 2 would be passed directly to unit 15. In this case the sulfur trioxide originally present would be recovered as ammonium sulfate in the scrubber liquid exit stream 18, and would pass through the succeeding processing steps without alteration and be recovered finally via 32. With this modification, it might be necessary to provide a filter in line 18 to remove solids scrubbed from the gas stream in 15.

The precipitation of fluoride values in unit 27 as described above is also subject to another modification. Depending on the composition of the solution, a significant quantity of silicon dioxide may be precipitated along with the metal fluoride. In such cases it may be desirable to produce the metal fluoride by a separate precipitation, free of silicon dioxide. This can be accomplished by initially adding only ammonia to the solution via line 28. The consequent rise in pH will result in decomposition of any silicofluoride present in the solution, and substantially complete precipitation of silicon dioxide. This is readily filtered off, and the fluoride subsequently precipitated from the solution by addition of metal salt.

Another alternative has been found advisable in certain cases. Depending on the proportions of components present and other factors, the fluoride present in the liquid effluent 18 from the scrubbing tower 15 may act as an inhibitor to the sulfite oxidation reaction in vessel 24. Additionally, the fluoride may cause excessive corrosion in unit 24. Consequently, another alternative process of this invention comprises a modified treatment of liquid effluent 18, in which the fluoride is first removed by raising the pH and adding a soluble metal salt. The precipitated metal fluoride is filtered off, the remaining solution is then oxidized in autoclave 24 as previously described, and finally the resulting ammonium sulfate solution is processed to recover product ammonium sulfate.

Finally, it should be noted that certain other oxidants such as ozone or peroxides could be used in the conversion of sulfite to sulfate. Also, utilization of known oxidation catalysts, such as manganese sulfate, might be feasible in order to improve the oxidation rate.

This invention is not restricted to the aforementioned modifications, as other minor variations will be apparent to those skilled in the art.

Examples of the application of this invention to specific industrial situations involving the thermal processing of a phosphate will now be described.

*Example 1*

In order to increase phosphorus availability of a phosphatic material, a small proportion of coal was added and intermixed with the phosphatic material, and the mixture was calcined in a rotary kiln. The kiln off-gas contained 2% sulfur dioxide, 0.5% sulfur trioxide, 0.7% hydrogen fluoride, and about 0.2% of silicon tetrafluoride. The gas stream was scrubbed with a circulating ammonium sulfite-bisulfite solution, and a rich solution was drawn off via line 21 containing about 7% ammonium fluoride, 2% ammonium silicofluoride and 30% ammonium sulfite. Temperature of the solution was 65° C. and pH 6.0.

Ammonia was added to the rich solution as ammonium hydroxide, until the pH was raised to 8.0. This resulted in the conversion of any residual bisulfite to sulfite, and also caused the decomposition of ammonium silicofluoride in the solution to yield a silicon dioxide precipitate. The solution was filtered to remove this silicon dioxide precipitate; over 96% of the silicon dioxide was removed from the solution in this manner.

The filtered solution, containing 380 grams per liter of ammonium sulfite, was passed into an autoclave and oxidized at 300 p.s.i.g. and 300° F. Air was employed as the oxidant, and oxidation was substantially completed after 13.0 minutes treatment. A small amount of sulfur dioxide was lost in the spent air stream, however, this was of minor consequence.

The oxidized solution was treated with a sodium sulfate-aluminum sulfate reagent having a sodium/aluminum ratio of 2.5. It was found in this case that the presence of the sodium salt improved the subsequent filtration and fluoride recovery. The quantity of reagent added was sufficient to provide 100% of the theoretical requirement for fluorine removal as aluminum fluoride. After precipitation and filtration, it was determined that over 99% of the fluorine had been removed from the solution.

The remaining solution was processed for recovery of ammonium sulfate by the successive steps of evaporative concentration and crystallization.

*Example 2*

Gas scrubbing conditions here were similar to Example 1. However, in processing the rich solution, fluoride values were removed before sulfite oxidation. Ammonia was added to the solution as before, until the pH was raised to 8.0. The resulting silicon dioxide precipitate was filtered off, and the filtered solution was treated with a sodium sulfate-aluminum sulfate reagent in a manner similar to that previously described. The resulting aluminum fluoride precipitate was recovered by filtration.

The remaining solution was passed into an autoclave and oxidized at 300 p.s.i.g. and 300° F. Air was employed as the oxidant so as to essentially duplicate the conditions of Example 1 except for the fact that fluoride was absent. The oxidation of sulfite to sulfate was completed in 10.5 minutes, compared to the 13.0 minutes required in Example 1. The solution was finally processed for recovery of ammonium sulfate by the successive steps of evaporative concentration and crystallization.

I claim:

1. Process of treating a gas stream containing sulfur dioxide and a fluorine compound selected from the group consisting of hydrogen fluoride and silicon tetrafluoride which comprises scrubbing said gas stream with aqueous ammonium sulfite solution, adding ammonia to the resulting solution to convert bisulfite to sulfite, oxidizing sulfite to sulfate, adding a metal salt selected from the group consisting of the soluble salts of aluminum, magnesium and calcium, thereby precipitating dissolved fluorine values as metal fluoride, separating solid metal fluoride precipitate from the residual ammonium sulfate solution, and recovering ammonium sulfate from said residual solution.

2. Process according to claim 1, in which the pH of the oxidized solution rich in fluorine values is raised to a value higher than 7 by the addition of ammonia, prior to the precipitation of metal fluoride.

3. Process according to claim 1, in which the metal salt is aluminum sulfate.

4. Process according to claim 1, in which the metal salt is added as a component of a salt mixture which also includes a soluble sodium salt.

5. Process according to claim 1, in which the sulfite is oxidized to sulfate by means of a gas containing free oxygen.

6. Process of treating a gas stream containing sulfur dioxide and a fluorine compound selected from the group consisting of hydrogen fluoride and silicon tetrafluoride which comprises scrubbing said off-gas with aqueous ammonium sulfite solution, adding ammonia to the resulting solution to raise the solution pH above 7, filtering precipitated silicon dioxide from the solution, adding a metal salt selected from the group consisting of the soluble salts of aluminum, magnesium and calcium, thereby precipitating dissolved fluorine values as metal fluoride, filtering precipitated solid fluoride from the solution, oxidizing the residual solution with free oxygen-containing gas at a pressure over 30 p.s.i.g., and processing the solution after said oxidation by suitable means to recover ammonium sulfate.

7. Process according to claim 6, in which the oxygen is added in the form of air and the pressure is over 150 p.s.i.g.

8. Process of treating a gas stream containing sulfur dioxide and a fluorine compound selected from the group consisting of hydrogen fluoride and silicon tetrafluoride which comprises scrubbing said gas stream with aqueous ammonium sulfite solution, adding ammonia to the resulting solution to convert bisulfite to sulfite and raise the solution pH to at least 8.0, filtering precipitated silicon dioxide from the solution, adding a soluble aluminum salt to the solution, filtering precipitated aluminum fluoride from the solution, oxidizing the residual solution with air at a pressure greater than 150 p.s.i.g., and processing the solution after said oxidation by suitable means to recover ammonium sulfate.

9. Process according to claim 8, in which the aluminum salt is aluminum sulfate.

10. Process according to claim 8, in which the aluminum salt is added as a component of a salt mixture which also includes a soluble sodium salt.

References Cited in the file of this patent

UNITED STATES PATENTS

| | | |
|---|---|---|
| 1,235,552 | Chappell | Aug. 7, 1917 |
| 1,740,342 | Hansen | Dec. 17, 1929 |
| 2,134,482 | Johnstone | Oct. 25, 1938 |
| 2,142,988 | Bacon et al. | Jan. 10, 1939 |
| 2,231,309 | Weber | Feb. 11, 1941 |
| 2,233,841 | Lepsoe | Mar. 4, 1941 |
| 2,785,953 | Fitch | Mar. 19, 1957 |
| 2,813,000 | Quittenton | Nov. 12, 1957 |
| 2,816,818 | Gross | Dec. 17, 1957 |
| 2,926,999 | Tarbutton et al. | Mar. 1, 1960 |

FOREIGN PATENTS

| | | |
|---|---|---|
| 20,377 | Great Britain | Sept. 5, 1896 |

OTHER REFERENCES

Mellor: "Comprehensive Treatise on Inorganic and Theoretical Chem.," vol. 2, page 137 (1922), Longmans, Green and Co., London and New York.

UNITED STATES PATENT OFFICE
CERTIFICATE OF CORRECTION

Patent No. 3,031,262                                                                  April 24, 1962

William J. Rosenbloom

It is hereby certified that error appears in the above numbered patent requiring correction and that the said Letters Patent should read as corrected below.

Column 1, line 65, for "temperathres" read -- temperatures --; column 3, line 57, for "of" read -- if --.

Signed and sealed this 7th day of August 1962.

(SEAL)
Attest:

ERNEST W. SWIDER
Attesting Officer

DAVID L. LADD
Commissioner of Patents